Feb. 1, 1966
M. RIGERT
3,233,067
HYDRAULIC INTEGRATING ASSEMBLY
FOR A CIRCUIT INTERRUPTER
Filed March 23, 1964
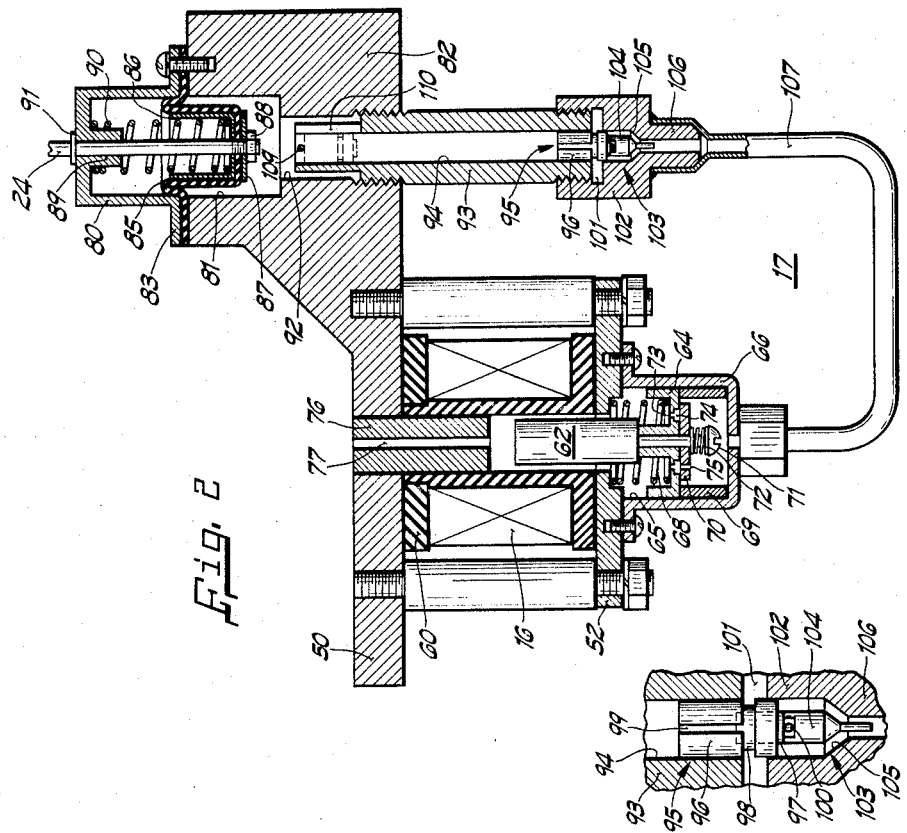
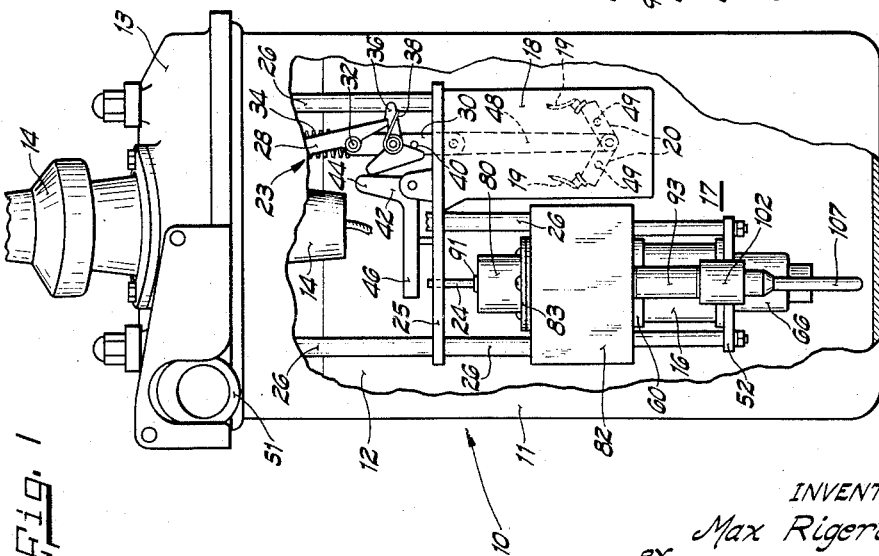
INVENTOR.
Max Rigert
BY Fred Wiviott
Attorney

United States Patent Office 3,233,067
Patented Feb. 1, 1966

3,233,067
HYDRAULIC INTEGRATING ASSEMBLY FOR A CIRCUIT INTERRUPTER
Max Rigert, West Allis, Wis., assignor to McGraw-Edison Company, Milwaukee, Wis., a corporation of Delaware
Filed Mar. 23, 1964, Ser. No. 353,674
10 Claims. (Cl. 200—108)

This invention relates to automatic electrical protective devices and more particularly to the integrating assembly for protective devices such as sectionalizing switches and repeating circuit interrupters or reclosers.

It is common practice in distribution systems to employ a repeating circuit interrupter or similar type of backup protective devices in series with the main distribution line and located adjacent the source of power, and sectionalizing switches in feeder lines radiating from the main line. Because the majority of faults in such systems are temporary in nature, and will clear in a relative short time, the backup protective devices are usually adjusted to execute a series of rapidly successive opening and reclosing operations upon the occurrence of a fault, during which time the sectionalizing switches remain closed. If the fault has not cleared after a predetermined number of such opening and closing operations, usually three, it is then considered permanent, in which case it must be isolated from the source. If the fault occurs in one of the feeder lines its associated sectionalizing switch will open subsequent to the third opening operation of the backup protective device or recloser thereby isolating the fault from the source. For this purpose, sectionalizing switches are provided with fault integrating means which count the number of fault current impulses and then operate the sectionalizing switch's opening means, whereupon the faulted feeder line will be isolated from the main line while the circuit to the remaining feeder lines remains intact. This opening of the sectionalizing switch's contacts takes place when the recloser is open so that the sectionalizing switch is not required to have interrupting ability. After the sectionalizing switch in the faulted section has opened, the recloser closes a fourth time thereby restoring service to the non-faulted feeder lines. If a permanent fault occurs in the main line, on the other hand, the sectionalizing switches will remain inactive as the recloser's fault integrating means locks the recloser open after the fourth switch opening operation.

One type of fault integrating means commonly used with sectionalizing switches and reclosers includes a hydraulic piston below which a measured quantity of hydraulic fluid is forced upon each fault current impulse. Each operation advances the integrating piston a predetermined distance toward a tripping member which is operative to release the sectionalizing switch's switch-opening mechanism or the recloser's lockout assembly. If the fault disappears before the requisite number of operations, the integrating piston in prior art devices settles to its initial position whereby the device is reset in preparation for another series of operations. It can be seen, however, that some settling of the integrating piston will also occur between interrupting operations. In applications wherein the time between circuit interrupter opening operations is relatively long, this settling of the integrating piston creates a serious problem because it may result in a lost count. In other words the total settlement of integrating piston may equal or exceed the advancement during one or more opening operations.

It is an object of the invention to provide operating counting means for automatic electrical devices which retains its count for a relatively long period of time.

It is another object of the invention to provide electrical protective device with hydraulic integrating means wherein there is no movement toward a reset position for a predetermined period of time.

A more specific object of the invention is to provide hydraulic integrating means for an automatic protective device wherein valve means prevents any movement of the device toward a reset position and wherein means are provided for opening the valve means after a predetermined interval.

These and other objects and advantages of the instant invention will become more apparent from the detailed description thereof taken with the accompanying drawings in which:

FIG. 1 is a side elevational view, with parts broken away, of a sectionalizing switch employing the instant invention;

FIG. 2 is a side elevational view, partly in section, of the integrating mechanism according to the instant invention; and FIG. 3 is a fragmentary view of a portion of the integrating mechanism shown in FIG. 2.

Referring to the drawings in greater detail, FIG. 1 shows a sectionalizing switch 10 having a metallic tank 11 filled with a dielectric fluid 12, such as oil, and a cover which supports incoming and outgoing porcelain bushings 14 (only one of which is shown) for connection to line wires (not shown). Bushings 14 extend interiorly of the tank 11 and beneath the level of the oil 12. In series circuit relation between bushings 14 are the current-responsive solenoid coil 16 of an integrating mechanism 17 and the main switch means 18 comprising stationary contacts 19 and movable contacts 20. The integrating mechanism 17, the contact assembly 18 and a contact latching assembly 23 are all mounted on a frame member 25 which is supported beneath cover 13 by a plurality of insulating support stringers 26.

The operation of the integrating mechanism 17 will be explained in greater detail hereinafter, it being sufficient at this point to state that each time a fault current traverses the solenoid coil 16, an associated vertically extending trip rod 24 will be moved upwardly a predetermined distance.

The latching assembly 23 includes upper and lower toggle links 28 and 30 respectively which are connected together by a knee pin 32. A contact opening spring 34 extends between knee pin 32 and cover 13 and urges said knee pin upward and to the right to collapse the toggle links 28 and 30. Such movement is prevented when the assembly is in its closed position as shown in FIG. 1 by a latching member 36 pivotally mounted on lower toggle link 30 and which engages the lower end of the upper toggle link 28 to prevent rotation of the toggle links about knee pin 32. Rotation of latch member 36 in a counterclockwise direction under the influence of wire spring 38 is limited by a stop pin 40 extending laterally from the lower toggle link 30. A tripping crank 42 is pivotally mounted on frame 25 and has a vertically extending arm 44 which engages trip member 36. Crank 42 also includes a horizontal arm 46 whose remote end lies in the path of trip rod 24. It can be seen that upon a predetermined vertical movement, trip rod 24 will move into engagement with the horizontal arm 46 of crank 42 to rotate said crank in a clockwise direction thereby forcing the trip member 36 clockwise against spring 38 to release toggle links 28 and 30 for movement under the influence of opening spring 34.

An insulating link 48 connects the movable contacts 20 to the lower toggle link 30 so that the release of the toggle linkage operates to move link 48 upwardly so that each of the movable contacts 20 are rotated about pivot pins 49 to an open position. The contact assembly 18 and the latching mechanism 23 may be reset by moving the operating handle 51 to its position shown in FIG. 1 from the rotated position it assumes upon the occurrence of a switch opening operation. It will be appreciated, too, that the contact assembly 18 and the latching mechanism 23 are well known in the art and the details thereof form no part of the instant invention.

The integrating mechanism 17 is shown in FIGS. 1 and 2 to be supported between casting 50 and a mounting plate which are suspended below the base 25 by insulating support members 26. Referring specifically to FIG. 2, the overload coil 16 is shown to be wound on a hollow non-conductive spool 60 which is suitably held between the casting 50 and the plate 52 and which telescopically receives a magnetic plunger 62 for reciprocal movement therein. A pump piston 64 is affixed to the plunger 62 by a pin 71 and is reciprocally movable in a cylinder 65 formed by a cup-shaped member 66 which is suitably affixed to the underside of the plate 52. A spring 68 surrounds the lower end of the plunger 62 and urges said plunger and the piston 64 against a stop ring 69 disposed in the lower end of the cylinder 65.

A valve plate 70 is mounted between the lower end of piston 64 and the head of the pin 71 and is urged against said piston by a spring 72. As a result, when the piston 64 is moving upwardly, the fluid within cylinder 65 will force the plate 70 outwardly to expose a plurality of openings 73 in the piston 64 to permit fluid to pass through the piston 64. On the other hand, when the piston 64 moves downwardly the fluid will force the plate 70 against the lower end of said piston to permit a pumping action.

A restricted fluid path is provided through the piston 65 by an annular groove 74 formed in its lower surface and in registry with the opening 73 and a relatively small aperture 75 is formed through the plate 70 and opening into the groove 74. In addition a magnetic plug 76 is disposed in the upper end of spool 60 and has an axial bore 77 so that the hydraulic fluid 12 may circulate into and out of the cylinder 65 whereby the oil 12 acts as a source of fluid for the integrating mechanism 17.

The integrating assembly 17 also includes a sealed housing consisting of an inverted, cup-shaped member 80 and a recess 81 formed in an enlarged portion 82 of the casting 50. The member 80 is secured to the upper surface of the casting portion 82 by a flange 83 which also serves to clamp the periphery of a diaphragm 85. The upper surface of the diaphragm 85 is engaged by a cup-shaped member 86 and its lower surface by a plate 87 which is secured between diaphragm 85 and the lower end of the stem 24 by a nut 88 which threadably engages the lower end of said stem. Stem 24 extends upwardly through the plate 87, the diaphragm 85, member 86 and through an intergral bushing 89 on the upper end of the housing member 80.

A spring 90, extending between the upper surface of member 86 and the housing member 80 urges the diaphragm 85 and the stem 24 downwardly into the recess 81. However, a washer 91 affixed to the stem 24 and engageable with the upper housing member 80 limits the downward travel of said stem.

A bore 92 is formed through the enlarged portion 82 of the casting 50 and opens into the lower end of the recess 81. Extending upwardly through the bore 92 is a cylinder member 93 having a central cylindrical bore 94 in which a free floating piston member 95 is disposed. The piston member 95 consists of a brass shell 96 which supports an Alnico magnet 97 extending from its lower end. A circumferential slot 98 is formed around the casing 96 and intermediate its ends and a longitudinal slot 99 extending from the upper end of the casing 96 to the slot 98 so that when the piston member 95 is in its settled position shown in FIG. 2, the upper end of said cylinder communicates with recess 101 formed between the lower end of the cylinder member 93 and a valve housing 102 affixed thereto.

A valve assembly 103 is disposed within the valve housing 102 and includes a ferromagnetic valve member 104 and a valve seat 105 is formed in the housing 102 so that when the valve member 104 rests against the seat 105 fluid flow from cylinder 93 to the conduit 107 is prevented. A nipple 106 is formed at the lower end of the valve housing 102 and is connected by a conduit 107 to the lower end of the cylinder 65 and below the piston 64. A transverse stop pin 100 extends across the valve housing 102 between the piston member 95 and the valve member 104.

Each time a fault current impulse traverses the line being protected, the magnetic plunger 62 is drawn upwardly into the spool 60 until it impacts the metal plug 76. This draws the piston 64 a predetermined distance upwardly wherein the hydraulic fluid within the chamber 65 is allowed to pass below the piston 64 as the valve plate 70 is forced away from blocking engagement relative to the apertures 73. When the backup recloser interrupts the line current, the plunger 62 and the piston 64 are released for movement downward by the spring 68 until said piston impacts the stop sleeve 69. This forces the valve plate 70 against the lower surface of the piston 64 so that a measured quantity of fluid trapped beneath said piston is delivered to the underside of the diaphragm 85 through the conduit 107 and the cylinder 93.

As the fluid enters the cylinder 93 and moves past the valve element 104 the piston member 95 will be forced upwardly in the cylinder 93 so that diaphragm 85 will move upwardly to move the stem 24 a predetermined distance toward the trip member 46. When the piston member 95 reaches the upper end of the cylinder 93 as shown by dotted lines in FIG. 2, it will engage a stop pin 109 extending transversely across the upper end of cylinder 93. Any excess fluid behind the piston member 95 may then flow into the recess 81 through a slot 110 formed in one side of the cylinder 93 adjacent its upper end.

Initially the ferromagnetic valve member 104 will be attracted to the piston member 95 when the latter is in its initial position adjacent the lower end of the cylinder 93. However, as the piston 95 begins moving upwardly during a pumping operation, the valve member 104 engages the stop pin 100 and is thereby disengaged from the piston 95 so that it remains adjacent the valve seat 105. When the flow of hydraulic fluid past the valve member 104 ceases, said valve member will then move downwardly against the seat 105 to prevent the flow of fluid out of the cylinder 93.

In addition, when the pump piston 64 is returned to its initial position by the spring 68 so that the flow of fluid through cylinder 93 ceases, the piston 95 will begin settling in the cylinder 93. The rate of this settlement will be determined by the rate at which the hydraulic fluid leaks between the piston 95 and the cylinder 93. However, because the valve element 104 is seated against the valve seat 105 so that the quantity of fluid within the cylinder 93 remains substantially constant, the diaphragm 85 is prevented from moving downwardly toward its initial position.

If the fault fails to clear after the first switch opening operation a second fault current will occur causing the magnetic plunger 62 to be drawn upwardly for a second time. When the backup recloser opens for the second time, a second measured quantity of fluid will be pumped through the conduit 107 and pass the valve element 104. The piston member 95 will be somewhere intermediate the ends of the cylinder 93 and again will be forced upwardly against the stop pin 109 as the fluid behind it passes through the slot 110 and beneath the diaphragm 85 forcing it a second predetermined distance upwardly toward the trip member 46. This will continue for a preselected number of operations, usually three, whereupon the stem 24 will engage the trip member 46 and the main contacts 18 will open.

In the event that the fault current disappears during one of the backup recloser's switch opening operations which is prior to the tripping of the sectionalizing switch's main contacts 18, the piston member 95 will be free to settle the entire length of the cylinder 93 until it is in close proximity to the stop pin 100. It will be recalled that during this entire period the diaphragm 85 was prevented from moving downwardly because the quantity of fluid within the cylinder 93 remains substantially constant. However, as the piston member 95 approaches its initial position, the magnet 97 will attract the ferromagnetic valve member 104 away from the valve seat 105 thereby placing the cylinder 93 in communication with the conduit 107 through the recess 101 and 98 and 99 on piston member 95. The spring 90 which urges the diaphragm 85 downwardly will then begin forcing hydraulic fluid from the cylinder 93 through the conduit 107 and through the small orifice 75 in the plate 70. As a result the diaphragm 85 will begin moving downwardly towards its initial position, and after a time determined by the size of the orifice 75, the diaphragm 85 will be in its initial position and the device is reset in preparation for further operations.

The integrating assembly according to the instant invention allows the retention of the count for periods of upwards to two minutes without any resettlement of the integrating stem 24.

While the integrating assembly according to the instant invention has been illustrated and discussed with respect to a sectionalizing switch it will be understood by those skilled in the art that it can be employed equally as well in a repeating circuit interrupter or recloser. In addition, while only a single embodiment of the invention has been illustrated and described it is not intended to be limited thereby but only by the scope of the appended claims.

I claim:

1. In a protective device, having switch means, and switch opening means, the combustion of a hydraulic integrating means operative upon each occurrence of a predetermined circuit condition to advance said switch opening means from an initial position toward a switch opening position whereby said switch means will be opened after a predetermined number of such integrating operations, means urging the resetting of said integrating means to its initial position between occurrences of said circuit condition, valve means for preventing a resetting of said integrating means, and valve release means for opening said valve means a predetermined time after the cessation of said circuit condition.

2. The protective device set forth in claim 1 wherein said integrating means includes pressure responsive means connected to said switch opening means, a fluid source and condition responsive pump means operable upon each occurrence of said predetermined circuit condition to deliver a measured quantity of hydraulic fluid from said fluid source to said pressure responsive means, said valve means being disposed between said fluid source and said pressure responsive means for preventing return fluid flow until opened by said valve release means.

3. The protective device set forth in claim 2 wherein said pressure responsive means includes a diaphragm, biasing means for urging said diaphragm toward its initial position, said valve release means including cylinder means connected to said pump means, and piston means disposed in said cylinder and biased toward said valve means, said piston means being movable away from said valve means by said hydraulic fluid during each pumping operation, the return of said piston means a predetermined distance toward said valve means being operative to open said valve means.

4. The protective device set forth in claim 3 wherein said piston means includes a magnet and said valve means includes a magnetically responsive valve element, said magnet being operative to attract said valve element out of its closed position upon settlement of said piston means a predetermined distance toward its initial position so that return fluid flow from said diaphragm to said fluid source is permitted.

5. The protective device set forth in claim 4 and including fixedly mounted means between said valve element and said piston means so that said element is released from said magnet for movement toward its closed position when said piston is moved away from said valve means by said hydraulic fluid.

6. The protective device set forth in claim 3 wherein said cylinder is connected between said pump means and said diaphragm and is disposed in a substantially vertical manner, said valve means being disposed adjacent the lower end of said cylinder and said diaphragm means adjacent the upper end thereof, said piston means being gravity biased toward said valve means.

7. The protective device set forth in claim 6 wherein said piston means includes a magnet and said valve means includes a magnetically responsive valve element, said magnet being operative to attract said valve element out of its closed position upon settlement of said piston means a predetermined distance toward its initial position so that return fluid flow from said diaphragm to said fluid is permitted, and fixedly mounted means disposed between said valve element and said piston means so that said element is released from said magnet for movement toward its closed position when said piston is moved toward said diaphragm by said hydraulic fluid.

8. In a circuit protective device, the combination of a hydraulic integrating means including first and second pressure responsive means each advanceable from an initial position upon each occurrence of a predetermined condition in said circuit, means urging the resetting of said first and second pressure responsive means to their initial positions between occurrences of said circuit condition, valve means operative to prevent the resetting of said first pressure responsive means and inoperative to prevent the resetting of said second pressure responsive means, said second pressure responsive means being operative when substantially reset to open said valve means to permit the resetting of said first pressure responsive means.

9. The circuit protective device set forth in claim 8 wherein a leakage path is provided for each of said first and second pressure responsive means, said valve means being disposed in the leakage path for said first pressure responsive means.

10. The circuit protective device set forth in claim 9 wherein said integrating means includes condition responsive pump means operable upon each occurrence of said predetermined circuit condition to deliver a measured quantity of hydraulic fluid to said first and second pressure responsive means, said valve means being disposed between said pump means and said first pressure responsive means and preventing return fluid flow until opened by said second pressure responsive means.

References Cited by the Examiner

UNITED STATES PATENTS

| | | | |
|---|---|---|---|
| 2,710,320 | 6/1955 | Weinfurt | 200—108 |
| 2,804,520 | 8/1957 | Kyle, et al. | 200—89 |
| 3,056,006 | 10/1962 | Froland | 200—97 |

BERNARD A. GILHEANY, *Primary Examiner.*

UNITED STATES PATENT OFFICE
CERTIFICATE OF CORRECTION

Patent No. 3,233,067                             February 1, 1966

Max Rigert

It is hereby certified that error appears in the above numbered patent requiring correction and that the said Letters Patent should read as corrected below.

Column 5, line 36, for "combustion" read -- combination --; line 44, for "a" read -- the --.

Signed and sealed this 10th day of January 1967.

(SEAL)

Attest:

ERNEST W. SWIDER                          EDWARD J. BRENNER

Attesting Officer                             Commissioner of Patents